Patented Sept. 25, 1945

2,385,695

UNITED STATES PATENT OFFICE 2,385,695

COPOLYMERIZATION PRODUCTS AND METHOD OF MAKING SAME

Robert R. Dreisbach, Midland, Mich., assignor to The Dow Chemical Company, Midland, Mich., a corporation of Michigan No Drawing. Application February 1, 1941, Serial No. 376,996

12 Claims. (Cl. 260—66)

This invention concerns certain new organic co-polymerization products and a method of making the same. It particularly concerns new rubber-like co-polymers which are exceptionally resistant to attack by usual hydrocarbon and halo-hydrocarbon solvents.

The new products with which the invention is concerned are co-polymers of conjugated diolefines, unsaturated ketones having the general formula:

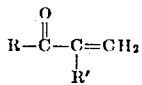

wherein R represents an alkyl radical and R' represents hydrogen or an alkyl radical, and unsaturated organo-nitriles having the general formula:

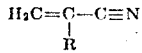

wherein R represents hydrogen or an alkyl radical. For convenience, unsaturated ketones having the above formula are hereinafter referred to generically as "alkyl alpha-methylene-alkyl ketones" and organo-nitriles having the general formula just given are referred to generically as "alpha-methylene-alkylcyanides."

Certain co-polymers of conjugated diolefines with vinyl-type ketones are already known, as are also other co-polymers of conjugated diolefines and alpha-methylene-alkyl cyanides. These previously known co-polymers are made up of a greater proportion by weight of the diolefine than of the ketone or nitrile. They are rubbery materials which, like natural rubber, become dissolved or greatly swollen upon contact with usual hydrocarbon or halo-hydrocarbon solvents such as benzene, toluene, carbon tetrachloride, ethylene chloride, etc. Neither they, nor natural rubber, may satisfactorily be used in hose or other equipment to be contacted with such solvents. Insofar as I am aware, no ternary co-polymer of a conjugated diolefine with both an alkyl alpha-methylene-alkyl ketone and an alpha-methylene-alkyl cyanide has heretofore been known.

One of the objects of this invention is to provide new ternary co-polymers of conjugated diolefines, alkyl alpha-methylene-alkyl ketones and alpha-methylene-alkyl cyanides which, after vulcanizing, are substantially insoluble in and exceptionally resistant to swelling by hydrocarbon and halo-hydrocarbon solvents.

I have discovered that the products obtained by polymerizing together a diolefine, an alkyl-alpha-methylene-alkyl ketone and an alpha-methylene-alkyl cyanide are, when cured, substantially insoluble in the above-mentioned solvents and are swollen to far less extent by such solvents than are the corresponding products of the co-polymerization of the diolefine with either the ketone or the nitrile alone.

The mechanical properties of the new products as determined after vulcanizing or curing the same, particularly their toughness and the extent to which they may be stretched without breaking, are influenced by the relative proportions of diolefine and alkyl alpha-methylene-alkyl ketone in the reaction mixture used in preparing them and also by other reaction conditions employed in carrying out the polymerization. Surprisingly, moderate changes in the amount of alpha-methylene-alkyl cyanide in the polymerization mixture have less effect on these properties of the products. In fact, the co-polymers of butadiene, methyl isopropenyl ketone and vinyl cyanide which contain up to 15 per cent of the latter in chemically combined form often have substantially the same toughness and may be elongated to approximately the same extent as co-polymers of butadiene and the ketone alone which have been prepared under similar polymerizing conditions. In general, the cured products prepared under otherwise similar conditions become tougher as the ratio by weight of alkyl alpha-methylene-alkyl ketone to diolefine is increased, e. g. from 0.25 to about 4. Products prepared from mixtures of a diolefine, an alkyl alpha-methylene-alkyl ketone and an alpha-methylene-alkyl cyanide in the same proportions, e. g. from mixtures which each contain 55 per cent by weight of methyl isopropenyl ketone, 45 per cent of butadiene, and 5 per cent of vinyl cyanide, usually become harder and less rubber-like as the polymerization rates are increased. Thus, the use of unduly high temperatures or of highly active polymerization catalysts in carrying out the polymerization may result in the formation of products which, when cured, are quite hard and will withstand only moderate elongation before breakage occurs.

On the other hand the amount by which the products are swelled by contact with usual hydrocarbon or halo-hydrocarbon solvents is dependent to a large extent upon the proportion of alpha-methylene-alkyl cyanide used in preparing them and also to some extent on the proportion of alkyl alpha-methylene-alkyl ketone employed in their preparation. In general, an increase in the proportion of alpha-methylene-alkyl cyanide in the polymerization mixtures used in making the products results in a decrease in the amount by which the products are swelled by such solvents. An increase in the proportion of alkyl alpha-methylene-alkyl ketone in the polymerization mixtures appears to have a similar, though usually a less pronounced, effect on the solubility of the products.

From the facts just presented, it will be seen that the new products become tougher and somewhat less readily swelled by such solvents as the proportion of alkyl alpha-methylene-alkyl ketone used in their preparation is increased and that they become markedly more resistant to swelling as the proportion of alpha-methylene-alkyl cyanide is increased. Accordingly, although all co-polymers of diolefines with alkyl alpha-methylene-alkyl ketones and alpha-methylene-alkyl cyanides are new and possess the advantages hereinbefore described, the products which comprise in chemically combined form at least 0.8 part by weight of the ketone and 0.1 part or more, preferably between 0.15 and 1.5 parts, of the alpha-methylene-alkyl cyanide per part of the diolefine are generally the toughest and most resistant to swelling by hydrocarbon and halo-hydrocarbon solvents and are preferred. The alpha-methylene-alkyl cyanide is preferably employed in amount corresponding to between 5 and 30 per cent of the combined weight of the polymerizable compounds. Usually, it is impractical to use more than 4 parts by weight of the ketone per part of the diolefine or to use more than 35 per cent by weight of the nitrile, based on the combined weight of the polymerizable compounds, in preparing the products, but there may be instances in which these agents may be employed in somewhat larger proportions.

The co-polymerization may be carried out to obtain useful products in any of the usual ways, e. g. by heating a mixture of the reactants in the presence or absence of a solvent or diluent and with or without the aid of usual polymerization catalysts such as benzoyl peroxide, hydrogen peroxide, etc., but, as hereinbefore mentioned, the mechanical properties of the products are influenced greatly by the reaction conditions employed.

When highly elastic products are desired, the copolymerization is preferably carried out in aqueous emulsion and without addition of usual peroxide catalysts. However, certain other polymerization catalysts, e. g. light, preferably of wave lengths between 3000 and 6000 Angstroms, and polychlorinated hydrocarbons, such as hexachloroethane, pentachloroethane, tetrachloroethylene, hexachlorobenzene, etc., may be used.

The new rubber-like co-polymers are preferably prepared as follows. The diolefine, alkyl alpha-methylene-alkyl ketone and alpha-methylene-alkyl cyanide in the desired proportions are mixed with an aqueous solution of an emulsifying agent and the mixture is agitated to effect emulsification. A small proportion of a highly chlorinated hydrocarbon, e. g. from 0.5 to 2 per cent of the combined weight of the polymerizable compounds, may advantageously be incorporated in the emulsion, but is not required. A number of emulsifying agents, such as egg albumen, soaps, sulphonic acids of aliphatic and alkyl-aromatic hydrocarbons of high molecular weight, sodium or potassium salts of such sulphonic acids, etc., which may be employed in preparing such emulsions are well known. The emulsifying agent is, of course, used in the proportion required to form a stable emulsion. Only a small proportion, e. g. from 1 to 3.5 per cent by weight of a sulphonate, based on the water present, is usually required.

The emulsion is warmed in a closed container preferably with agitation and under exposure to light of the quality hereinbefore specified, to a temperature between about 30° and 100° C., preferably between 50° and 70° C., to effect the polymerization. The reaction usually is substantially complete after from 10 hours to 3 days of heating.

The product may be recovered from the emulsion in any of the usual ways, e. g. by coagulation or by evaporation of the water. It usually resembles uncured rubber. It may be compounded with usual rubber-compounding agents, e. g. carbon black, fillers, anti-oxidants, accelerators, vulcanizing agents, etc., and cured to obtain a synthetic rubber of good quality which is unusually resistant to swelling or other attack by most hydrocarbon or halo-hydrocarbon solvents.

The following table shows the amount by which each of a series of cured rubber-like co-polymers of butadiene, methyl isopropenyl ketone and vinyl cyanide was swelled by prolonged exposure to the respective solvents carbon tetrachloride and toluene. For purpose of comparison, similar data concerning the swelling action of each solvent on a co-polymer of butadiene and vinyl cyanide alone and also on a co-polymer of butadiene and methyl isopropenyl ketone alone are included. With the exception of the co-polymer of butadiene and vinyl cyanide, which was prepared by others but was compounded and cured as hereinafter described, the procedure followed in preparing the co-polymers was as follows. In each experiment, the polymerizable compounds named in the table in the parts by weight given were added, together with 1 per cent of their combined weight of hexachloroethane, to an aqueous solution of Turkey red oil, i. e. sulphonated castor oil, and Dreft, i. e. a mixture of sodium sulphate and sodium salts of higher mono-alkyl sulphates in concentrations of 3.5 per cent by weight and 1 per cent, respectively. The combined weight of the polymerizable compounds in the mixture corresponded to about 0.8 of the weight of the water. The mixture was agitated in a closed container to effect emulsification. The emulsion was heated with agitation in the container to 60° C. under exposure to light, which had been screened to remove most light of wave lengths less than 3200 angstroms, for approximately 65 hours. The light was provided by a 400 watt mercury vapor lamp situated about 14 inches from the emulsion. After completing the heating operations, the container was opened and water was evaporated (under vacuum) from the emulsion. The residual rubbery product was heated for 2 hours at 100° C. at pressures which were gradually reduced to about 20 millimeters absolute pressure in order to evaporate any volatile ingredients therefrom. Each co-polymer so-prepared, and also the co-polymer of butadiene and vinyl cyanide alone, was compounded with 50 per cent of its weight of carbon black, 10 per cent of zinc oxide, 3 per cent of sulphur, 2 per cent of pine tar, 2 per cent of rosin, and 0.1 per cent of mercaptothiazole. The compounded material was rolled into a sheet and cured by heating under pressure at 148° C. for 20 minutes. Test strips were cut from the sheets and were used in determining the swelling characteristics of the products in the solvents. The procedure in carrying out a swelling test was to determine the volume of a test strip, immerse the strip in the solvent for 7 days at room temperature, and again determine the volume of the strip. The table identifies each product by naming and giving the parts by weight of the compounds which were polymerized together in preparing it and gives the amount by which each product was swelled in terms of per cent of the volume of the product before contact with the solvent.

Table

| Run No. | Starting materials | | | Per cent swelling of product by— | |
|---|---|---|---|---|---|
| | Parts of butadiene | Parts of methyl isopropenyl ketone | Parts of vinyl cyanide | Carbon tetrachloride | Toluene |
| 1 | 1 | None | 0.37 | 110 | 132 |
| 2 | 1 | 1.22 | None | 138 | 169 |
| 3 | 1 | 0.89 | 0.111 | 107 | 136 |
| 4 | 1 | 1.25 | 0.25 | 57 | 105 |
| 5 | 1 | 1 | 0.5 | 55 | 86 |
| 6 | 1 | 1.17 | 1.17 | 26 | 73 |
| 7 | 1 | 1.6 | 1.4 | 25 | 25 |

In the above table, it will be noted that the proportion of vinyl cyanide to butadiene in Run 1 is intermediate between those in Runs 4 and 5. Also, the proportion of methyl isopropenyl ketone in Run 4 is practically the same as in Run 2. From comparison of the swelling characteristics of the binary product of Run 1 with those of the ternary products of Runs 4 and 5 and by similar comparison of the binary product of Run 2 with the ternary product of Run 4, it will be seen that a product of the co-polymerization of butadiene, methyl isopropenyl ketone, and vinyl cyanide is swelled to far less extent by the solvents than are corresponding products prepared by the co-polymerization of butadiene with methyl isopropenyl ketone alone or with vinyl cyanide alone. Runs 3–7 of the table show that the amount by which the ternary co-polymerization products are swelled by the solvents becomes less as the proportion of vinyl cyanide in the products is increased. The swelling characteristics of the ternary products toward such solvents appear to depend to a large extent upon the ratio of vinyl cyanide to butadiene in the ternary polymerization mixture and to decrease in quite regular manner with increase in this ratio. The generalizations just given apply when the products to be compared vary only in composition and are prepared under otherwise similar conditions.

All of the compounded and cured products mentioned in the foregoing table were strong, pliable and highly elastic products of good quality.

The invention may be applied in making other ternary co-polymers of diolefines, alkyl alpha-methylene-alkyl ketones and alpha-methylene-alkylcyanides. Examples of such other ternary co-polymers are those of butadiene, methyl vinyl ketone, and vinyl cyanide; those of butadiene, methyl vinyl ketone and isopropenyl cyanide; those of butadiene, methyl alpha-ethyl-vinyl ketone, and vinyl cyanide; those of butadiene, methyl isopropenyl ketone, and isopropenyl cyanide; those of isoprene, methyl vinyl ketone, and vinyl cyanide; those of isoprene, methyl isopropenyl ketone, and vinyl cyanide; those of isoprene, methyl vinyl ketone, and isopropenyl cyanide; and those of isoprene, methyl isopropenyl ketone, and isopropenyl cyanide; etc. In each such series, the cured co-polymerization products become swelled to less extent by hydrocarbon and halo-hydrocarbon solvents as the proportion of alpha-methylene-alkyl cyanide used in preparing them is increased.

Other modes of applying the principle of the invention may be employed instead of those explained, change being made in the steps or compounds herein disclosed, provided the steps or compounds stated by any of the following claims or the equivalent of such stated steps or compounds be employed.

I therefore particularly point out and distinctly claim as my invention:

1. The method which comprises forming an aqueous emulsion which contains a lower aliphatic conjugated diolefine and between 0.8 and 4 parts of an alkyl alpha-methylene-alkyl ketone and between 0.1 and 1.5 parts of an alpha-methylene-alkyl cyanide per part of the diolefine, the alpha-methylene-alkyl cyanide being present in amount not exceeding 35 per cent of the combined weight of the compounds just mentioned, and co-polymerizing said compounds while in the emulsion.

2. The method which comprises forming an aqueous emulsion of butadiene-1.3 and between 0.8 and 4 parts of methyl isopropenyl ketone and between 0.15 and 1.5 parts of vinyl cyanide per part of the butadiene-1.3, the vinyl cyanide being present in amount not exceeding 35 per cent of the combined weight of the compounds just named, and co-polymerizing said compounds while in the emulsion.

3. A rubber-like copolymer consisting essentially of 1 part by weight of a lower aliphatic conjugated diolefine, between 0.8 and 4 parts of an alkyl alpha-methylene-alkyl ketone and between 0.15 and 1.5 parts of an alpha-methylene-alkyl cyanide in chemically combined form, which copolymer contains not more than 35 per cent by weight of the chemically combined alpha-methylene-alkyl cyanide.

4. A rubber-like copolymer consisting essentially of 1 part by weight of butadiene-1.3, between 0.8 and 4 parts of an alkyl alpha-methylene-alkyl ketone and between 0.15 and 1.5 parts of an alpha-methylene-alkyl cyanide in chemically combined form, which copolymer contains less than 35 per cent by weight of the chemically combined alpha-methylene-alkyl cyanide.

5. A rubber-like copolymer consisting essentially of 1 part by weight of butadiene-1.3, between 0.8 and 4 parts of methyl-isopropenyl ketone and between 0.15 and 1.5 parts of an alpha-methylene-alkyl cyanide in chemically combined form, which copolymer contains less than 35 per cent by weight of the chemically combined alpha-methylene-alkyl cyanide.

6. A rubber-like copolymer consisting essentially of 1 part by weight of butadiene-1.3, between 0.8 and 4 parts of methyl-isopropenyl ketone and between 0.15 and 1.5 parts of vinyl cyanide in chemically combined form, which copolymer contains less than 35 per cent by weight of the chemically combined vinyl cyanide.

7. A rubber-like copolymer consisting essentially of 1 part by weight of butadiene1.3, between 1.25 and 1.6 parts of methyl-isopropenyl ketone and between 0.25 and 1.4 parts of vinyl cyanide in chemically combined form, which copolymer contains not more than 35 per cent of the vinyl cyanide.

8. A copolymer as described in claim 3 when vulcanized.

9. A copolymer as described in claim 4 when vulcanized.

10. A copolymer as described in claim 5 when vulcanized.

11. A copolymer as described in claim 6 when vulcanized.

12. A copolymer as described in claim 7 when vulcanized.

ROBERT R. DREISBACH.